(12) United States Patent
Baumann et al.

(10) Patent No.: US 11,257,375 B2
(45) Date of Patent: Feb. 22, 2022

(54) METHOD AND SYSTEM FOR DETECTING OBJECTS IN A VEHICLE BLIND SPOT

(71) Applicant: Ficosa Adas, S.L.U., Barcelona (ES)

(72) Inventors: Florian Baumann, Lindau (DE); Ariadna Bartra, Lindau (DE)

(73) Assignee: Ficosa Adas, S.L.U., Barcelona (ES)

(*) Notice: Subject to any disclaimer, the term of this patent is extended or adjusted under 35 U.S.C. 154(b) by 339 days.

(21) Appl. No.: 16/236,768

(22) Filed: Dec. 31, 2018

(65) Prior Publication Data
US 2020/0211398 A1 Jul. 2, 2020

(51) Int. Cl.
| | |
|---|---|
| G08G 1/16 | (2006.01) |
| B60R 11/00 | (2006.01) |
| G08G 1/052 | (2006.01) |
| B60Q 9/00 | (2006.01) |
| B60R 11/04 | (2006.01) |

(52) U.S. Cl.
CPC .......... *G08G 1/167* (2013.01); *B60Q 9/008* (2013.01); *G08G 1/052* (2013.01); *B60R 11/04* (2013.01); *B60R 2011/0042* (2013.01)

(58) Field of Classification Search
CPC ........ G08G 1/167; G08G 1/052; B60Q 9/008; B60R 2011/0042; B60R 11/04
USPC ....................................... 348/148
See application file for complete search history.

(56) References Cited

U.S. PATENT DOCUMENTS

| | | | |
|---|---|---|---|
| 9,721,169 B2 * | 8/2017 | Kiyohara | H04N 5/2252 |
| 2011/0103650 A1 * | 5/2011 | Cheng | B60R 1/00 382/104 |
| 2012/0026295 A1 * | 2/2012 | Nishimura | G01B 11/26 348/46 |
| 2013/0027196 A1 * | 1/2013 | Yankun | G06K 9/00805 340/435 |
| 2013/0063257 A1 | 3/2013 | Schwindt et al. | 340/425.5 |
| 2013/0070095 A1 * | 3/2013 | Yankun | G06T 7/254 348/148 |
| 2013/0195321 A1 * | 8/2013 | Sacchi | G06T 7/00 382/103 |
| 2014/0009617 A1 * | 1/2014 | Utagawa | G08G 1/167 348/148 |
| 2015/0187224 A1 * | 7/2015 | Moncrief | G09B 9/24 434/30 |
| 2015/0201120 A1 * | 7/2015 | Irie | G06K 9/00825 348/148 |
| 2015/0302257 A1 * | 10/2015 | Takemura | G06T 7/20 382/104 |

(Continued)

OTHER PUBLICATIONS

G. Jager et al., "Lane Change Assistant System for Commercial Vehicles equipped with a Camera Monitor System," Commercial Vehicle Technology 2018, Proceedings, pp. 37-50, Mar. 13-15, 2018, Kaiserlautern, Germany.

*Primary Examiner* — Tung T Vo
(74) *Attorney, Agent, or Firm* — Ostrolenk Faber LLP

(57) ABSTRACT

A method for detecting objects in a vehicle blind spot comprises the following steps:
  generating a region of interest onto an image taken from one camera placed on one side of the vehicle;
  generating a top view of the region of interest;
  detecting an object in the region of interest;
  determining if the object in the region of interest is a target object; and
  triggering a signal if it is determined that there is a target object in the region of interest.

16 Claims, 4 Drawing Sheets

(56) References Cited

U.S. PATENT DOCUMENTS

| | | | |
|---|---|---|---|
| 2016/0155024 A1* | 6/2016 | Partis | G06T 7/90 |
| | | | 382/173 |
| 2016/0307054 A1* | 10/2016 | Takemura | H04N 5/2171 |
| 2018/0102055 A1* | 4/2018 | Lim | G06K 9/6201 |
| 2018/0165527 A1* | 6/2018 | Park | G06T 7/248 |
| 2019/0164430 A1* | 5/2019 | Nix | G08G 1/163 |

* cited by examiner

METHOD AND SYSTEM FOR DETECTING OBJECTS IN A VEHICLE BLIND SPOT

BACKGROUND OF THE INVENTION

Field of the Invention

The present invention refers to a method and system for detecting objects in a vehicle blind spot.

Description of Related Art

A vehicle blind spot is a lateral zone near the vehicle in which the driver has no vision by any side or rear mirror. When the driver wants to change lanes, the driver cannot see any vehicle in this blind spot, so that side collisions are possible.

Technology helps the driver offering systems for detecting vehicle blind spots, so that the system warns the driver with a visual, acoustic and/or vibrating signal that a vehicle is in the blind spot.

Two side zones may be differentiated: "Left/Right Rear Zone" and "Left/Right Adjacent Zone". The adjacent zone is the zone which is the closest zone to the vehicle and the rear zone is the zone which is behind the vehicle.

These systems are usually known as "Lane change decision aid systems" (LCDAS). These systems are fundamentally intended to warn the driver of the subject vehicle against potential collisions with vehicles to the side and/or to the rear of the subject vehicle and moving in the same direction as the subject vehicle during lane change maneuvers.

These systems are intended to supplement the vehicle's exterior rear-view mirrors, not eliminate the need for such mirrors. When the driver indicates the desire to make a lane change, the system evaluates the situation and warns the driver if a lane change is not recommended. The system will not take any automatic action to prevent possible collisions, and so, the responsibility for the safe operation of the vehicle remains with the driver.

Existing blind spot detection systems have difficulty differentiating between a stagnating vehicle and a stationary object. A stagnating vehicle is one that is moving at almost the same speed as the host vehicle and remaining in the blind spot of the host vehicle. A blind spot detection warning should be triggered when a stagnating vehicle is detected, but should not be triggered by a stationary object, e.g. a guardrail, a concrete barrier, or a utility pole.

Failure to distinguish between a stagnating vehicle and a stationary object limits the effectiveness of the blind spot detection system and leads a driver to mistrust warnings produced by the system.

According to existing blind spot detection systems, when an object is detected, the system attempts to calculate the actual speed of the detected object based on the speed of the host vehicle. If the actual speed of the object is greater than a threshold, the system determines that a moving vehicle is located in the blind spot of the host vehicle and triggers a blind-spot-detection signal. If the actual speed of the object is less than the threshold, the system determines that the object is stationary and does not trigger the blind-spot detection signal.

The driver's assistance system is capable of detecting objects in the blind spot of a host vehicle. The system includes a control unit that receives input signals from one or more sensors. The control unit includes a processor and a memory storing executable instructions.

The driver's assistance system alerts the driver of the host vehicle to the presence of an object in its blind spot. The various sensors of the host vehicle monitor the blind spots for objects. When an object is detected in the blind spot, the control unit attempts to determine the actual speed of the object in the blind spot based on data received from the right blind spot sensor.

The actual speed of the object is then compared to a threshold. In some systems, the threshold is a static value set at the time of manufacture while in other systems the threshold is a value calculated based on the speed of the host vehicle. If the system is able to determine that the actual speed of the object is less than a threshold, the system determines that it is a stationary object such as a utility pole or a parked vehicle.

One example of these systems is shown in US2013/0063257 A1, which discloses a system for detecting objects in the blind spot of a host vehicle. When an object is detected in the blind spot of the host vehicle, the system analyzes other objects directly in front of or behind the detected object in the blind spot. If the other objects are moving, the system concludes that the object in the blind spot is also moving and, therefore, is a stagnating vehicle. If the other objects are not moving, the system concludes that the object in the blind spot is also a stationary object. The system generates a blind-spot-detection signal when it determines that a stagnating vehicle is located in the blind spot.

BRIEF SUMMARY OF THE INVENTION

Therefore, it is an object of the present invention to solve the problem of detecting vehicles in the blind spot of the subject vehicle.

The purpose of the present invention is to detect the presence of moving vehicles in the blind spot of the vehicle by the images taken from a camera. In case of a detection, the system shall output a warning.

It is another object of the present invention to use a single camera per vehicle side, and so, avoid the complexity of using two or more sensors per vehicle side (or using a moving/rotating camera).

It is another object of the present invention to develop a system which allows the driver to avoid collisions in all possible lane change scenarios: collision with high speed vehicles in case of a target vehicle in the rear zone, and collision in case of a target vehicle in the adjacent zones.

Additionally, the prior art uses mainly two types of technologies to do the tracking, which are machine learning and optical flow.

The optical flow is the detection and selection of at least one characteristic (a point, or a pixel) of a frame of an image and the location of the same characteristic (point or pixel) in each succeeding frame until a vector ("flow vector") is obtained based on the trajectory of the points.

The optical flow selects two or more image points in the image frames, tracking a motion trajectory of each selected image point in the image frames. Then, at least one flow vector based on the motion trajectory tracked is obtained.

Conversely, in the present invention there is no optical flow, nor machine learning, nor clustering (grouping of portions). Instead, the present invention works on numerical values based on top-view images. It is known that working on numerical values requires less computational power than working with image processing.

With the method and system according to the present invention it is possible to solve said drawbacks, providing other advantages that are described below.

According to a first aspect, the present invention refers to a method for detecting objects in a vehicle blind spot, wherein it comprises the following steps:

generating a region of interest onto an image taken from one camera placed in one side of the vehicle oriented rearwardly with respect to the vehicle;

generating a top view of the region of interest;

detecting an object in the region of interest;

determining if the object in the region of interest is a target object; and triggering a signal if it is determined that there is a target object in the region of interest.

It must be pointed out that said steps in the method according to the present invention can be made in a different order, e.g. the top view can be generated before generating a region of interest.

Furthermore, the term object refers to any object, such as another vehicle, a person, an animal, and also a shadow.

According to a preferred embodiment, the generation of the top view of the region of interest is carried out by Inverse Perspective Mapping (IPM) homography computation.

Said mapping homography computation comprises preferably mapping a 3D grid onto an image plane of the ground, so that each point in the grid is assigned a corresponding intensity value from the image plane, redistributing the information content of the image plane into a new two-dimensional domain.

According to a preferred embodiment, the detection of an object in the region of interest is carried out by horizontal mean computation.

Said horizontal mean computation comprises preferably:

dividing the top view of the region of interest in a number of rows;

determining an intensity average value of each row;

normalizing the intensity average values of the rows with respect to a maximum mean value; and generating a 1D array with the intensity normalized average values.

It must be pointed out that said horizontal mean computation could be done in any order, e.g. preferably the normalizing of the average values could be done before determining the average value of each row.

According to a preferred embodiment, the determination whether the object in the region of interest is a target object is carried out by track horizontal computation, which preferably comprises applying normalized cross correlation in all the positions of the 1D array.

Preferably, the method can also comprise the step of filtering out target objects with inconsistent motion. That step of filtering can be carried out also by ego-motion computation, determining the vehicle speed with respect to the road. According to a second aspect, the present invention refers to a system for detecting objects in a vehicle blind spot using the method described previously, wherein the system comprises a blind spot detection module including only one camera on each side of the vehicle.

Said camera is a camera that is fixed during operation, maintaining the field of view during operation. However, this camera can be moved or folded when it is not operated.

The system according to present invention can also comprise a side collision warning module to detect the target objects in the rear zone.

It must be pointed out that the side collision warning does not work for the adjacent zone, because the image is distorted when the detected object approaches the vehicle, i.e. it passes from the rear zone to the adjacent zone. Firstly, the frontal portion of the vehicle is seen and at the end the side portion of the vehicle is seen.

Preferably, in the step of determining if the object in the region of interest is moving only movements similar to a vehicle are considered, so that fixed objects, such as transit signals and objects moving in a direction opposite to the movement direction of the vehicle, are discarded.

BRIEF DESCRIPTION OF THE DRAWINGS

For a better understanding of the above explanation and for the sole purpose of providing an example, some non-limiting drawings are included that schematically depict a practical embodiment.

FIGS. 6 and 7 are two examples of horizontal means values, wherein FIG. 6 shows that there is no vehicle on the adjacent lane and FIG. 7 shows that there is a vehicle on the adjacent lane.

DESCRIPTION OF A PREFERRED EMBODIMENT

Figure 1:
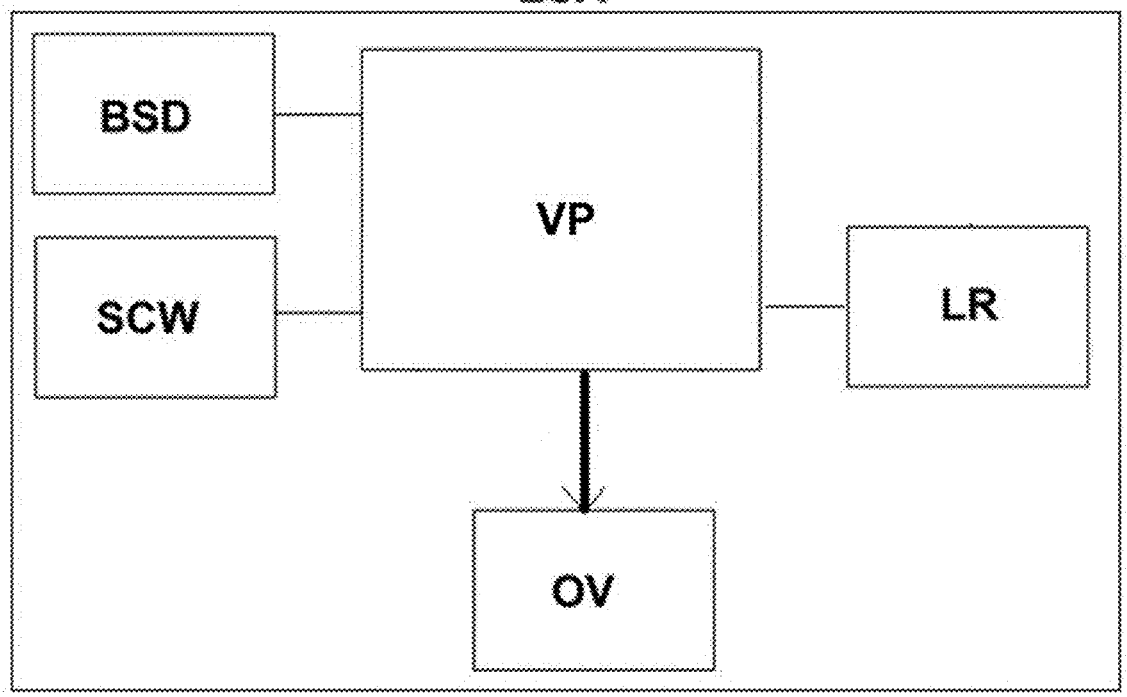
FIG. 1 is a block diagram of the modules of a detection system according to a preferred embodiment of the present invention.

According to a preferred embodiment, the system comprises the following modules, shown in FIG. 1, which are connected to an Electronic Control Unit (ECU):

Blind Spot Detection (BSD) module: This module detects the presence or absence of vehicles in the near adjacent areas. This module is the basis of the present invention and it will be described in more detail hereinafter, the rest of the modules being optional.

Lane Recognition (LR) module: This module detects lane markings for the adjacent lane, so that it gives information about an area of interest, and it can be used to show free space in adjacent lanes, and also identify possible lane change actions. This LR module is used with the SCW module (described hereinafter) and it is not used with the BSD module.

Side Collision Warning (SCW) module: This module detects and estimates 3D parameters for those objects approaching from rear zone areas. This module can include a Focus of Attention (FOA) module, a fine classification module, and an Unscented Kalman Filter (UKF) module.

Output Visualizer (OV) module is a module, whose main task is to provide Human Machine Interface (HMI), including mainly overlays derived from previous modules' output interface.

Video Preprocessing (VP) module performs all image preprocessing that is shared between other modules, i.e. at least noise reduction and edge detection. This module combines the information from modules BSD, SCW and LR, and sends this information to the OV module.

Lane Change Assist (LCA) combines all the modules.

The Blind Spot Detection (BSD) module uses the following inputs and provides the following output.

Inputs:
Camera images, such as grey images, e.g. 1280×800 grey level image with 8-bit color depth, but other types, such as, color images, LIDAR images, etc., are possible;
Camera calibration (intrinsic and/or extrinsic);
Vehicle information (which is optional), such as speed (m/s) and yaw rate (rad/s);
Time stamp, such as, in milliseconds.

The output is to determine if the adjacent lane is occupied.

Figure 2:
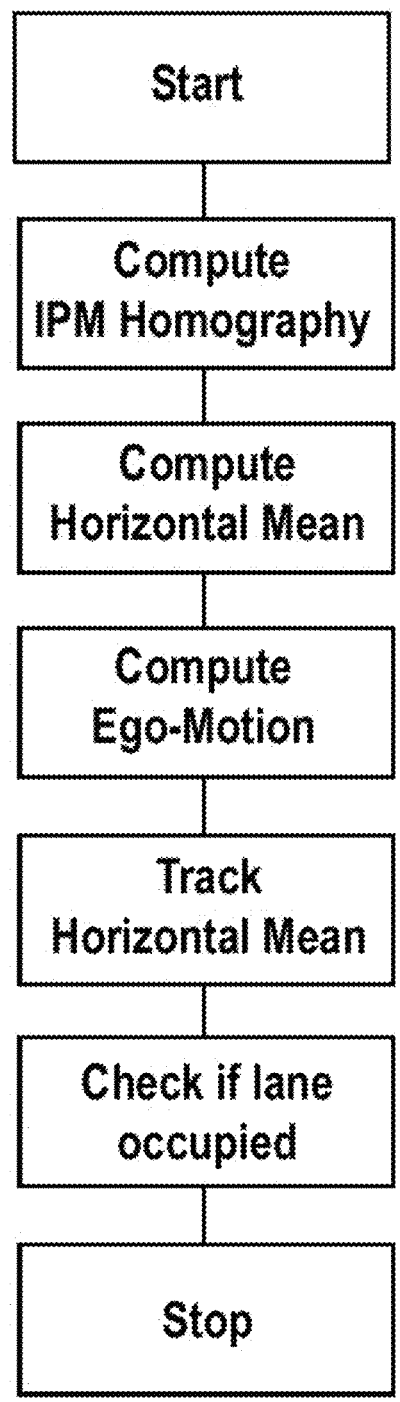
FIG. 2 is a block diagram of the steps carried out in the method according to present invention.

FIG. 2 shows the steps carried out in the BSD module according to a preferred embodiment of the method according to the present invention.

In particular these steps are:
take an image to the rear-side (the rear zone and/or the adjacent zone) of the vehicle;
generate a region of interest;
compute IPM homography;
compute horizontal mean;
compute ego-motion (which is an optional step); and
track horizontal mean (also called "tracker").

Now these steps are described individually:

Compute IPM Homography:

After the steps of taking an image to the rear-side of the vehicle from a single camera provided in a side of the vehicle and the step of generating a region of interest of the image taken, the system creates a top view image of the region of interest.

For example, a grey scale 2D image (but other types, such as, color images, LIDAR images, can be possible) is mapped to a ground plane by means of IPM. In IPM the angle of view under which a scene is acquired and the distance of the objects from the camera (namely the perspective effect) contribute to associate a different information content to each pixel of an image. The perspective effect in fact must be taken into account when processing images in order to weigh each pixel according to its information content.

IPM allows removal of the perspective effect from the acquired image, remapping it into a new 2-dimensional domain in which the information content is homogeneously distributed among all pixels, thus allowing the efficient implementation of the following processing steps with a Single Instruction, Multiple Data (SIMD) paradigm. Obviously, the application of the IPM transform requires the knowledge of the specific acquisition conditions (camera position, orientation, optics, etc.) and some assumption on the scene represented in the image (here defined as a-priori knowledge, for example assuming the road in front of the vision system is planar). Thus, the IPM transform can be of use in structured environments, where, for example, the camera is mounted in a fixed position or in situations where the calibration of the system and the surrounding environment can be sensed via another kind of sensor.

The IPM is not based on lane detection. This method obtains 4 end-points of a pair of lanes in perspective image which is not based on any lane detection algorithm.

Figure 3:
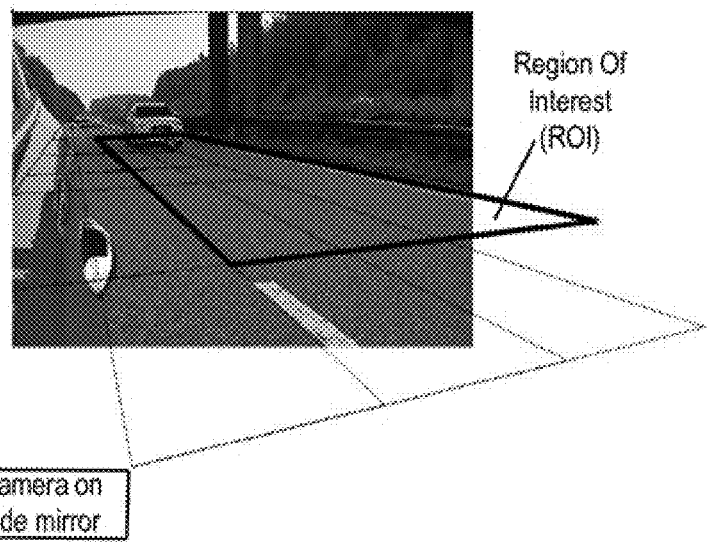
FIG. 3 is a perspective view of an example of a 3D grid mapped onto an image plane of the ground with respect to the vehicle.

Then, a 3D grid is mapped onto an image plane of the ground (FIG. 3), so that each point in the grid is assigned its corresponding intensity value from the image plane. It must be cited that the image can be any kind of image, such a color image (RGB) or a gray image (e.g. 1280×800 grey level image with 8-bit color depth).

Figure 4:
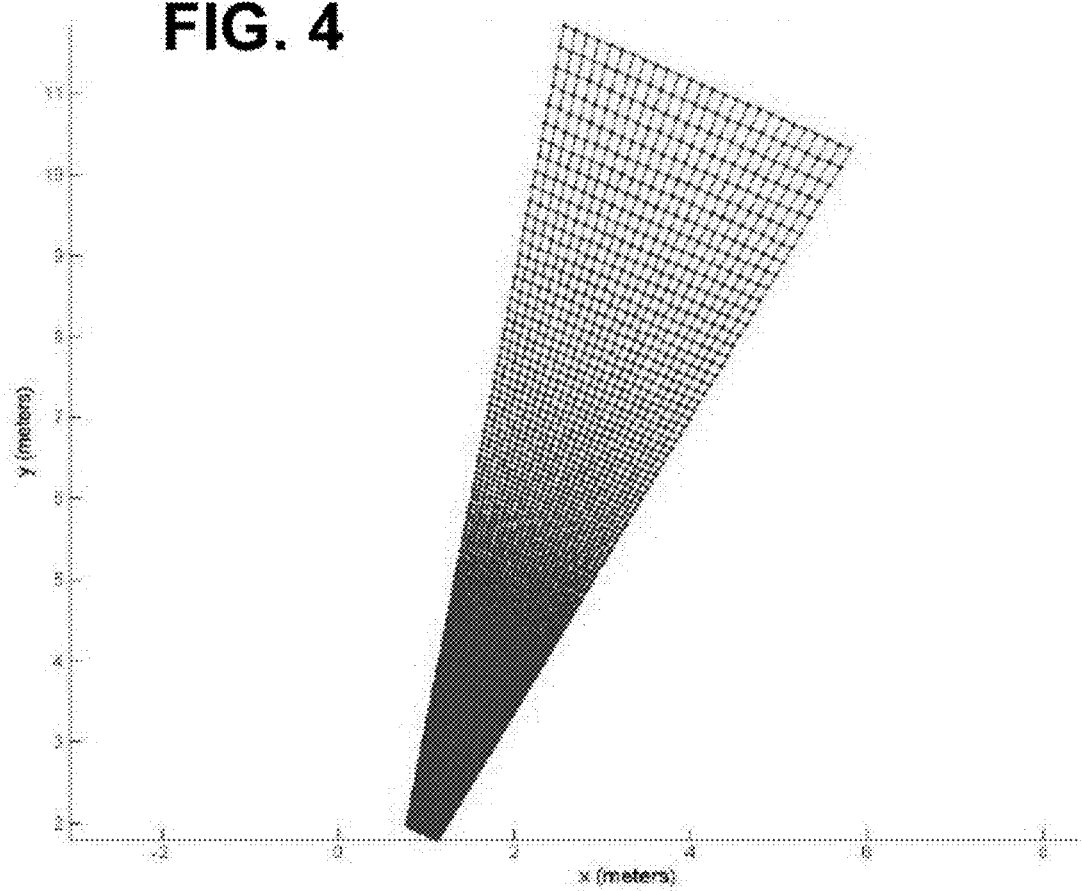
FIG. 4 is an example of a grid mapping onto an image plane.

Bear in mind that the inverse perspective mapping (IPM) scheme is another method for obtaining a bird's eye view of the scene from a perspective image. The inverse perspective mapping technique can also be used to remove the perspective distortion caused by the perspective projection of a 3D scene into a 2D image (FIG. 4). In general, each proposed inverse perspective mapping method uses different transformation mechanisms.

Figure 5:
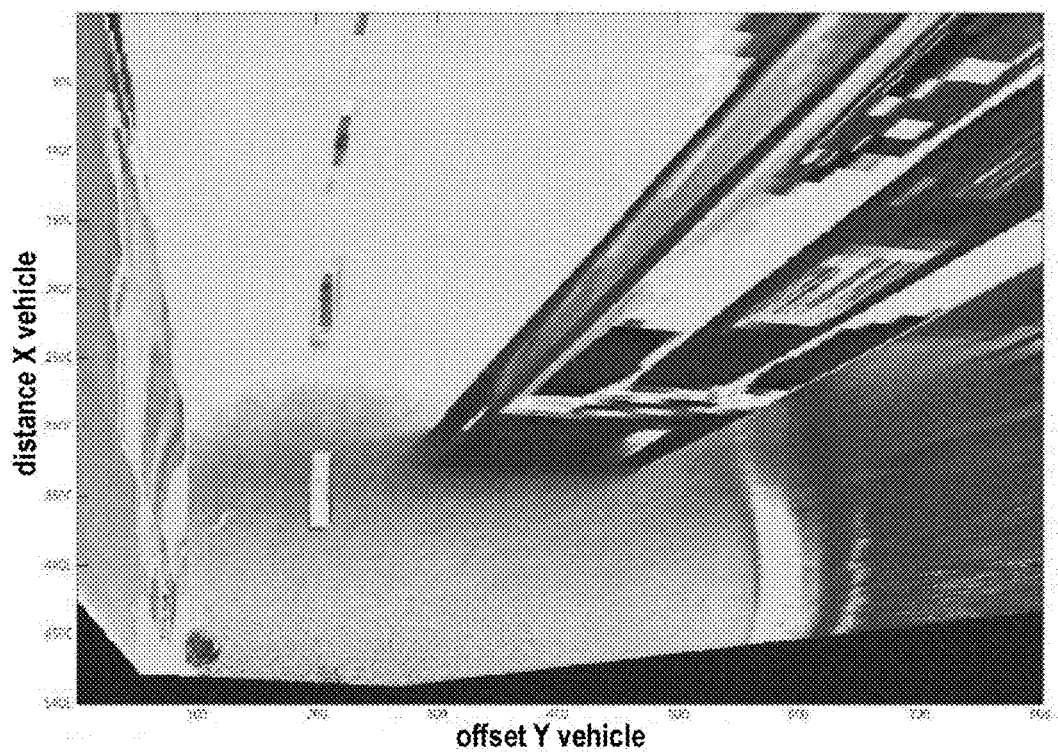
FIG. 5 is an example of a final mapped image into a ground plane.

FIG. 5 illustrates a final mapped image into ground plane. In particular, this example shows an image mapped onto a ground plane of 8 meters to the left (horizontal) of the vehicle and 50 meters to the back (vertical). Notice that this example is not up to scale.

Compute Horizontal Mean:

In this step, the average value of rows on the top view image (IPM image) is determined and a 1D array is generated. The computed horizontal mean converts the top view image into a 1-D vector information, for example, by summing the intensity values of the same row in the horizontal direction for each position of the 1-D vector.

The average value of each row on the IPM image is computed. This produces a 1D array with the same size as the IPM image height. All values, as preferred, are normalized with respect to the maximum mean value. In addition, spatio-temporal smoothing is applied in order to remove noise caused by small spikes. A spatial smoothing may be computed by applying a 3×1 mean mask on each element of the array, i.e. every element may be averaged with its direct neighbors. Temporal smoothing may be computed by means of weighted average of each element of the array with its previous value. Current values may be given higher weights.

Figure 6:
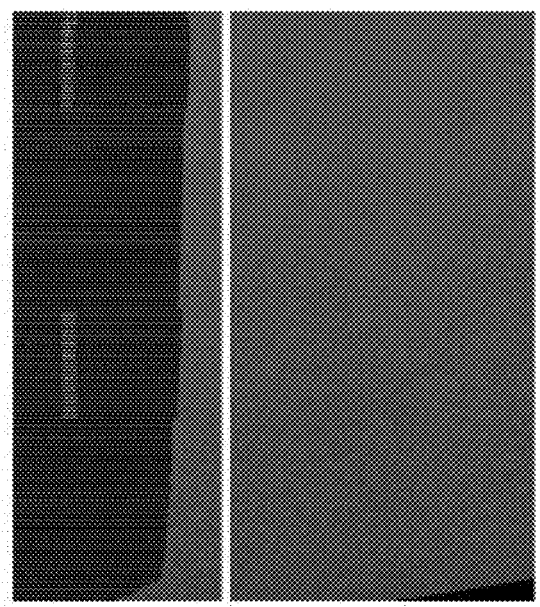
Figure 7:
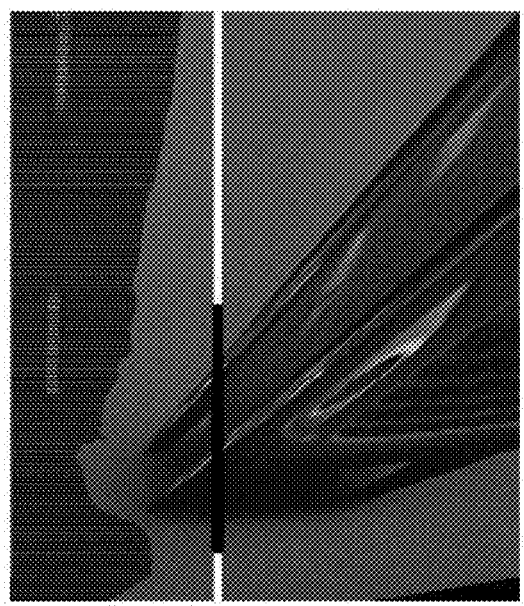

FIGS. 6 and 7 shows two examples of horizontal mean values, in FIG. 6 there is no vehicle on the adjacent lane, while on FIG. 7 there is a vehicle.

One can observe that the mean horizontal values without a vehicle are almost uniform, which does not happen when a vehicle is present.

Ego-Motion Computation:

This step is optional and is used for filtering out objects with inconsistent motion, such as shadows from bridges or trees, false alarms from adjacent fence, or vehicles moving in the opposite direction. The ego-motion computation is used as a double check for reducing false negatives in combination with said tracker.

The ego-motion is obtained by computing vehicle motion, and then mapping this metric in pixels onto the IPM image.

For example, if the vehicle is moving at 30 m/s, it means that at 30 fps it will move 1 m/frame.

Then, knowing the number of pixels per meter in the IPM image, allows one to obtain the motion in pixels on the IPM image. In particular, the ego-motion takes into account: (i) speed of the car through the Controller Area Network (CAN), (ii) time between frames, and (iii) size of the IPM (i.e. relationship between pixel and distance of the exterior world of the camera). Therefore, the ego-motion returns distance expressed in pixels. This information will later on be useful to filter out elements inside the 1D array that have for instance opposite motion. It is also useful to cluster them together based on their motion.

In the ego-motion firstly is calculated the relative speed between the road and the vehicle.

From this information, how many pixels have moved in the area of interest are calculated, and blocks of a predefined size that have the same movement are grouped.

Next, the blocks that have an incoherent or opposite movement are deleted (e.g. cars in the opposite direction), and finally vehicles that are approaching are identified.

Track Horizontal Mean (Tracker):

This step determines the motion of objects on the road, mainly on the IPM image. According to one preferred example, after the computation of the mean value of each row and the possible ego-motion, a tracking is computed on the 1D array. The core of the tracking is the Normalized Cross Correlation (NCC).

The Tracker is used to determine any change related to the relative position of the detected object between two frames. Thus, if there is a change of the relative position of the detected object, this means that said detected object has a displacement. Therefore, the Tracker is used to check if the detected object has moved with respect to the previous frame or if it has not moved, i.e. it is static. In particular, the objective of the Tracker is to determine if the captured objects by the camera have a displacement, and if said displacement is a realistic displacement.

For this, a method that compares two signals is required. In particular, it is a comparison of a value of the current frame and a value of the previous frame. In a preferred example, the comparison function is the Normalized Cross Correlation (NCC), but it could be another function, such as, a Sum of Square Difference (SSD), or a Sum of Absolute Difference (SAD).

NCC outputs a measure of similarity of two series as a function of the displacement of one relative to the other. In a preferred example, NCC returns a value between −1 and 1, where the value of 1 means a high level of similarity between signals. NCC is used to match two dimensional signals: the current frame with the previous frame. This match allows identification of the position of one object within the IPM image. Therefore, the tracker may determine the displacement of said object as well as its motion direction.

Ego-motion, which is optionally in the tracker, can be used for additional filter of objects based on the vehicle (absolute) speed. In addition, a persistence filter is applied to remove sporadic or inconsistent motion.

In particular, the tracker includes three iterations (loops), wherein in a preferred example the 3rd loop is inside the 2nd loop and the 2nd loop inside the 1st loop:

The 1st loop checks a plurality of positions (from two positions to all positions) of the 1D array (vertical vector). In a preferred example, the 1st loop checks all positions of the 1D array (vertical vector) from the first position to the last position (the last position of the vector corresponds to the height of the IPM image, in particular, to the height of the 2D image of the top view image). In a further example, the 1st loop checks from position 1 to position 250, the position 250 being the last position of the 1D array (vertical vector).

In the 2nd loop the different possible displacements of the previous frame (frame −1) are iterated. Thus, it is possible to check (compare) the value of a determined position of the current frame within a preselected range for the previous frame (frame −1). Said preselected range is calculated from a displacement parameter. Therefore, it is possible to compare between a pattern (e.g. a value of determined position of the current frame) and a range (e.g. a plurality of values of the previous frame). The 2nd loop is iterated in the previous frame (frame −1) until a maximum value is reached (i.e. the maximum displacement taken from the position), and therefore, the 2nd loop does not take into account values out of the displacement range in order not to take into account unnecessary search positions.

For example, we are in position 100 of our 1D array (vertical vector). A displacement parameter is selected (e.g. 30). Then, we compare position 100 of said 1D array of the current frame with positions 70 (100−30) to 130 (100+30) of the previous frame (frame −1). In a preferred example, we first compare position 100 of the current frame with position 70 (100+(−30)) of the previous frame, returning a similarity value between them. Then, we continue with the iteration increasing the displacement, that is: position 71 (100+(−29)) of the previous frame is compared with position 100 of the current frame, returning a similarity value between them. In one example, the tracker only takes into account the highest similarity value. Thus, if the similarity value between position 71 of previous frame and position 100 of current frame is higher than the similarity value between position 70 of the previous frame and position 100 of current frame, then the similarity value between position 70 of the previous frame and position 100 of the current frame is disregarded. Then, we continue with the iteration increasing the displacement, that is: position 72 (100+(−28)) of the previous frame is compared with position 100 of the current frame. Said similarity value is compared with the highest similarity value obtained so far. As explained, the tracker only takes into account the highest similarity value, and so the other similarity values are disregarded. Thus, the tracker allows a rapid skipping of the positions that cannot provide a better degree of match than the current best-matching one. We continue with the iteration until the tracker reaches position 130 (100+30). Therefore, position 100 of the current frame has been compared to the range from position 70 to position 130 of the previous frame (frame −1).

In some examples, positions below 70, and positions above 130, are not taken into consideration. In some other examples, positions below 70, and positions above 130 are taken into account. In some other examples, all positions of the 1D array of the current frame are taken into account. Parameter 30 can be changed (e.g. it can be 29, 28, etc. or 31, 32, etc.).

In the 3rd loop a mean Kernel is iterated. This arises because an object can have a single position of the vertical vector (1D array), or it can be two positions, or it can have a size of three positions, etc. Therefore, we will compare the displacement of 1 position of the current frame with a position of the previous frame, a block of 2 positions of the current frame with a block of 2 positions of the previous frame, a block of 3 positions of the current frame with a block of 3 positions of the previous frame, and so on.

For example, the maximum Kernel value is 150, but it could be another value (e.g. 149, 145, etc.). Half of the maximum value of the Kernel is calculated (150/2) which is 75. If for example, we are in position 100, we calculate: 100−75.

Therefore, we will go from position 25 (100−75) to 175 (100+75). In conclusion, here we consider the measure of the object, that is, the displacement of a group of positions (this group can be a position of the vertical vector or many positions).

Therefore, we group the blocks of a predefined size that have the same movement.

The tracker, in addition to including the aforementioned 3 loops, also uses the information provided by the loops, that is, computes the displacement, discards objects with unusual movement or that are not of interest, and performs minor tasks such as updating variables, copying vectors, etc. For example, negative movements (in the opposite direction) and/or too large movements (errors) are discarded.

The tracker does not process any image, so it is very light (in terms of computational power), and the tracker works on numerical values based on the top view image.

In summary, the invention provides a system and a method for detecting objects in the blind spot of a vehicle.

Changing lanes can be particularly hazardous when another vehicle is continuously operating in the blind spot of the vehicle in an adjacent lane.

Side Collision Warning (SCW) and the (Blind Spot Detection) BSD modules work out independently.

For "right/left rear zone" Side Collision Warning (SCW) module is used, whereas for the "right/left adjacent zone" BSD is used.

The Lane Recognition (LR) module is used only for the Side Collision Warning (SCW) module, not for the BSD module.

It must be pointed out that BSD does not take into account the speed of the object as such. The Track Horizontal Mean compares the displacement of two consecutive frames to identify the object's motion direction, and to remove sporadic or inconsistent motion.

Additionally, there is an optional module called Egomotion computation, which is the only module for BSD module that takes into account the detected object speed.

The BSD module comprises only one camera per side. No other sensors (i.e. positioning sensors) are needed and there is no actuator/motor to rotate the camera (change the field of view).

Even though reference has been made to a specific embodiment of the invention, it is obvious to a person skilled in the art that the method and system described herein are susceptible to numerous variations and modifications, and that all of the details mentioned can be replaced by other technically equivalent details without departing from the scope of protection defined by the attached claims.

The invention claimed is:

1. A method for detecting objects in a vehicle blind spot, wherein the method comprises:
    generating a region of interest onto a first image taken from one camera placed in one side of the vehicle;
    generating a top view of the region of interest;
    dividing the top view of the region of interest into a plurality of rows;
    determining an average value of each row of the plurality of rows;
    generating a first 1D array containing the average value of each row;
    detecting an object based on the 1D array;
    comparing the average values of the first 1D array with values of a second 1D array containing a second set of average values;
    determining that the object in the top view of the region of interest is a moving object based on the comparing; and
    triggering a signal indicating that the moving object has been determined in the region of interest.

2. The method according to claim 1, wherein the generation of the top view of the region of interest is carried out by inverse perspective mapping homography computation.

3. The method according to claim 1, wherein the determination that the object in the region of interest is moving is carried out by track horizontal mean computation.

4. The method according to claim 1, wherein the method further comprises filtering out objects with inconsistent motion.

5. The method according to claim 4, wherein the filtering out is carried out by horizontal mean computation.

6. The method according to claim 2, wherein the mapping homography computation comprises mapping a 3D grid onto an image plane of the ground, so that each point in the grid is assigned a corresponding intensity value from the image plane.

7. The method according to claim 3, wherein the track horizontal mean computation comprises a method of measuring a level of similarity between signals from two different frames.

8. The method according to claim 7, wherein the method of measuring the level of similarity comprises a normalized cross correlation.

9. The method according to claim 4, wherein is filtering out is carried out by ego-motion computation.

10. The method according to claim 1, wherein in determining that a target object in the region of interest is present, only objects with movements similar to a vehicle are considered.

11. A system for detecting objects in a vehicle blind spot using the method according to claim 1, wherein the system comprises a blind spot detection module including only one camera on each side of the vehicle for detecting target objects in a zone adjacent to the vehicle.

12. The system according to claim 11, wherein the system also comprises a side collision warning module for detecting target objects in a rear zone.

13. The system according to claim 11, wherein said camera is a fixed camera during operation.

14. The method according to claim 9, wherein the ego-motion computation comprises determining the vehicle speed with respect to the road.

15. The method of claim 1, wherein the second set of average values of the second 1D array is generated based on average values derived from a second plurality of rows of the region of interest of a second image taken by the camera subsequent to the first image.

16. The method of claim 15, wherein the determining that the object is the moving object is made when a first portion of the second 1D array corresponding to the detected object includes values similar to values of the first 1D array corresponding to the detected object.

* * * * *